United States Patent [19]

Wiltzius

[11] 4,265,717
[45] May 5, 1981

[54] METHOD AND APPARATUS FOR PROTECTING ELECTRODES FROM THERMAL SHOCK DURING START UP

[75] Inventor: Raymond D. Wiltzius, East Wenatchee, Wash.

[73] Assignee: Aluminum Company of America, Pittsburgh, Pa.

[21] Appl. No.: 92,441

[22] Filed: Nov. 8, 1979

[51] Int. Cl.³ .......................... C25C 3/06; C25C 3/08
[52] U.S. Cl. .................................. 204/67; 204/243 R; 204/280; 204/292; 204/293
[58] Field of Search ...................... 204/67, 243 R, 280, 204/292, 293

[56] References Cited

U.S. PATENT DOCUMENTS

| 4,071,420 | 1/1978 | Foster | 204/67 |
| 4,146,444 | 3/1979 | Minick | 204/67 |
| 4,177,128 | 12/1979 | Rahn | 204/243 R |

FOREIGN PATENT DOCUMENTS

1046705 10/1966 United Kingdom .................. 204/67

Primary Examiner—Howard S. Williams
Attorney, Agent, or Firm—Glenn E. Klepac

[57] ABSTRACT

Method and apparatus for protecting electrodes of an electrolytic cell from thermal shock when the temperature of the cell is raised from room temperature to an elevated operating temperature. For aluminum electrolysis at about 950° C., a cavity in each cathode is filled with a metal plug, preferably a solid plug of 33.2% Cu—Al alloy. A portion of each cathode protruding into a chamber of the cell is provided with a sleeve of insulating material, preferably expanded fibrous kaolin. A heat dispersing means encircles each cathode radially outwardly thereof. A preferred form of the heat dispersing means is a stainless steel jacket located externally of the insulating material sleeve. After the cell is heated, the chamber is filled with a bath, and electrolysis is established.

32 Claims, 3 Drawing Figures

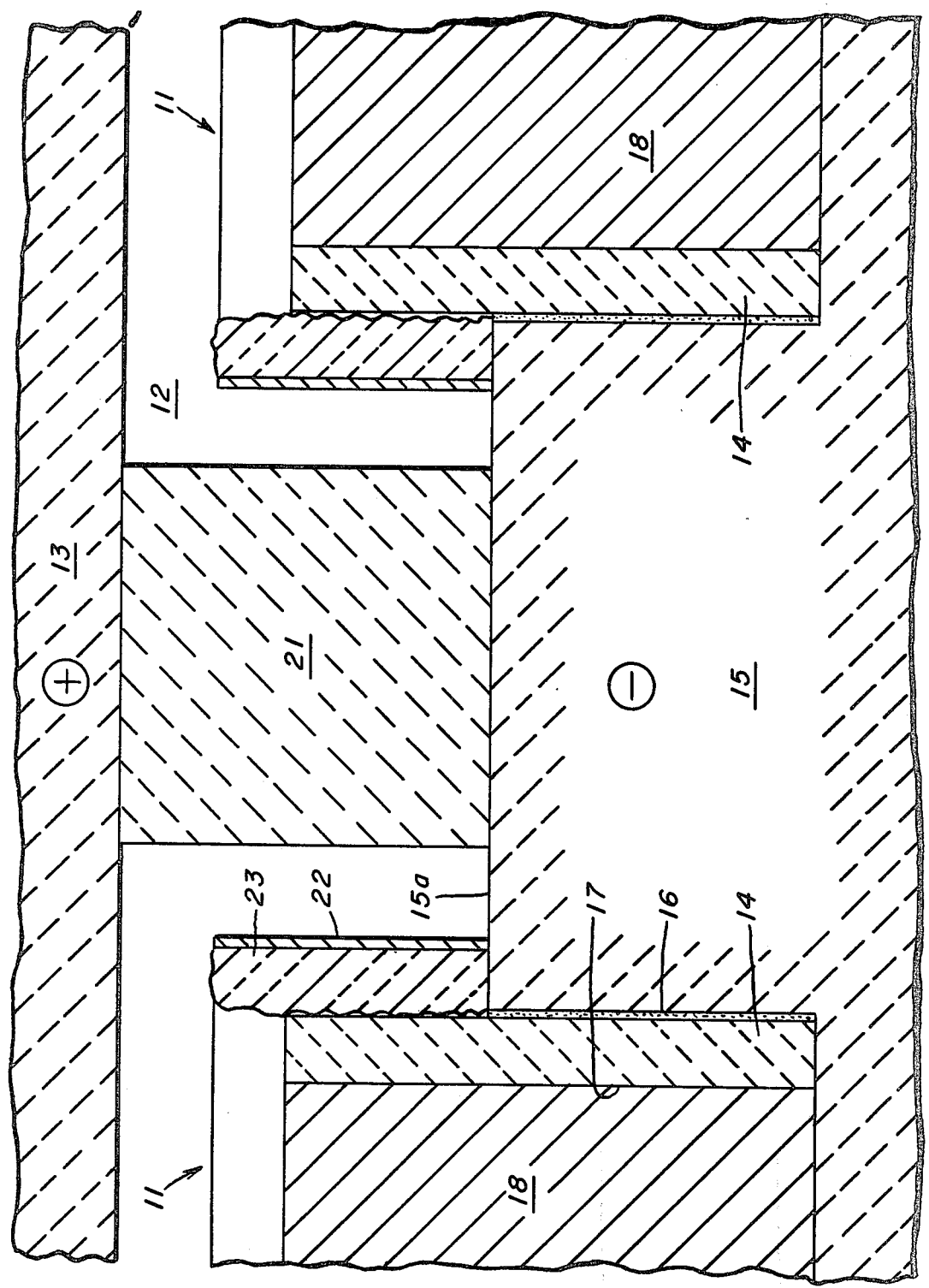

METHOD AND APPARATUS FOR PROTECTING ELECTRODES FROM THERMAL SHOCK DURING START UP

BACKGROUND OF THE INVENTION

The present invention relates to thermal shock protection during initial heat up stages for electrodes of an electrolytic cell operating at an elevated temperature. Electrodes of the type requiring thermal shock protection by the method and apparatus of the present invention are described in Foster et al U.S. Pat. No. 4,071,420 issued Jan. 31, 1978. In a preferred embodiment, the cathodes of the Foster et al patent are hollow cylindrical bodies of sintered $TiB_2$ protruding out of a metal pad toward the anode. While the cathodes of the Foster et al patent are highly effective for the production of aluminum after being heated to an elevated operating temperature, it has been found in practice that such cathodes tend to be brittle and subject to cracks and breakage if not protected from thermal shock in the initial heat up or start up stages by the method and apparatus of the present invention.

A form of thermal shock protection for $TiB_2$ electrodes during start up of an electrolytic cell is shown in Colley British Pat. No. 1,046,705, issued Oct. 26, 1966. In FIG. 5 and on pages 2-4 of the specification, Colley discloses an insulating layer around each refractory metal element comprising a one-half inch thick layer of powdered alumina. In a preferred embodiment, the insulating layer is retained in an aluminum container that melts away at cell operating temperatures. However, the Colley patent fails to teach the desirability of providing a metal heat dispersing means having a melting point at least approximating the operating temperature of the cell, as disclosed and claimed herein. The refractory metal electrodes shown in the Colley patent are solid rather than hollow so that the need for a heat conductor means inserted within a cavity in a hollow body electrode during start up is not suggested by Colley.

It is a principal object of the present invention to provide a method and apparatus for protecting electrodes from cracks and breakage accompanying thermal shock during initial heat up of an electrolytic cell for production of a metal at an elevated operating temperature.

It is a related object of the invention to provide a method and apparatus for protecting electrodes of an electrolytic cell during heat up to an elevated operating temperature, wherein the materials providing protection are compatible with efficient operation of the cell after the operating temperature has been reached.

Further objects of the invention are to provide a heat conductor means for insertion into a cavity in a hollow cathode of an electrolytic cell; to provide an insulating means protecting a hollow cathode from thermal shock during initial heat up stages of an electrolytic cell; and to provide a heat dispersing means for minimizing temperature differences between various locations on the hollow cathode when the interior of an electrolytic cell is heated by an auxiliary heat source.

Additional objects and advantages of the invention will become apparent to persons skilled in the art from the following specification taken in conjunction with the drawings.

SUMMARY OF THE INVENTION

The foregoing objects and advantages are preferably achieved by providing an electrode of an electrolytic cell with three separate forms of protection from thermal shock during start up from room temperature to an elevated operating temperature. In a preferred embodiment of the invention all three types of protection are provided. However, in other electrolytic cells it may be economically practical to provide only one or two of the forms of protection described herein.

Three separate forms of thermal shock protection for an electrode which may be used in practicing the present invention are as follows:

1. When the electrode is a hollow body, a heat conductor means is inserted into a cavity in the hollow body. In a preferred embodiment wherein the cell is used for electrolytic production of aluminum, the heat conductor means comprises a solid plug of 33.2% Cu—Al alloy having a melting point of about 547° C.

2. When the cell is heated by an auxiliary heat source and the electrode includes a portion protruding into a chamber in the cell, the protruding portion is encircled by a heat dispersing means proximate the electrode. The heat dispersing means comprises a metal jacket having a melting point at least approximating the operating temperature of the cell. In a preferred embodiment, the metal jacket is stainless steel having a melting point of about 1440° C., is highly resistant to oxidation at temperatures of up to at least 1400° C. and is soluble in the cell chamber media after operating temperature is reached and the cell is placed into operation.

3. When the cell is heated by an auxiliary heat source and the electrode includes a portion protruding into a chamber in the cell, a heat insulating means is interposed between the protruding portion of the electrode and the heat source. The insulating means is soluble in a molten bath poured into the cell chamber after operating temperature has been reached. In a preferred embodiment, the heat insulating means is a sleeve of expanded fibrous kaolin circumscribing the exposed portion of a cathode. The preferred insulating means comprises a one-half inch thickness of material having a thermal conductivity less than about 0.7 $BTU/(hr)(ft^2)(°F./in)$.

BRIEF DESCRIPTION OF THE DRAWINGS

FIG. 3 is a fragmentary cross-sectional view taken along the line 3—3 of FIG. 2, wherein the cell is heated to its operating temperature.

DETAILED DESCRIPTION OF A PREFERRED EMBODIMENT

Figure 1:
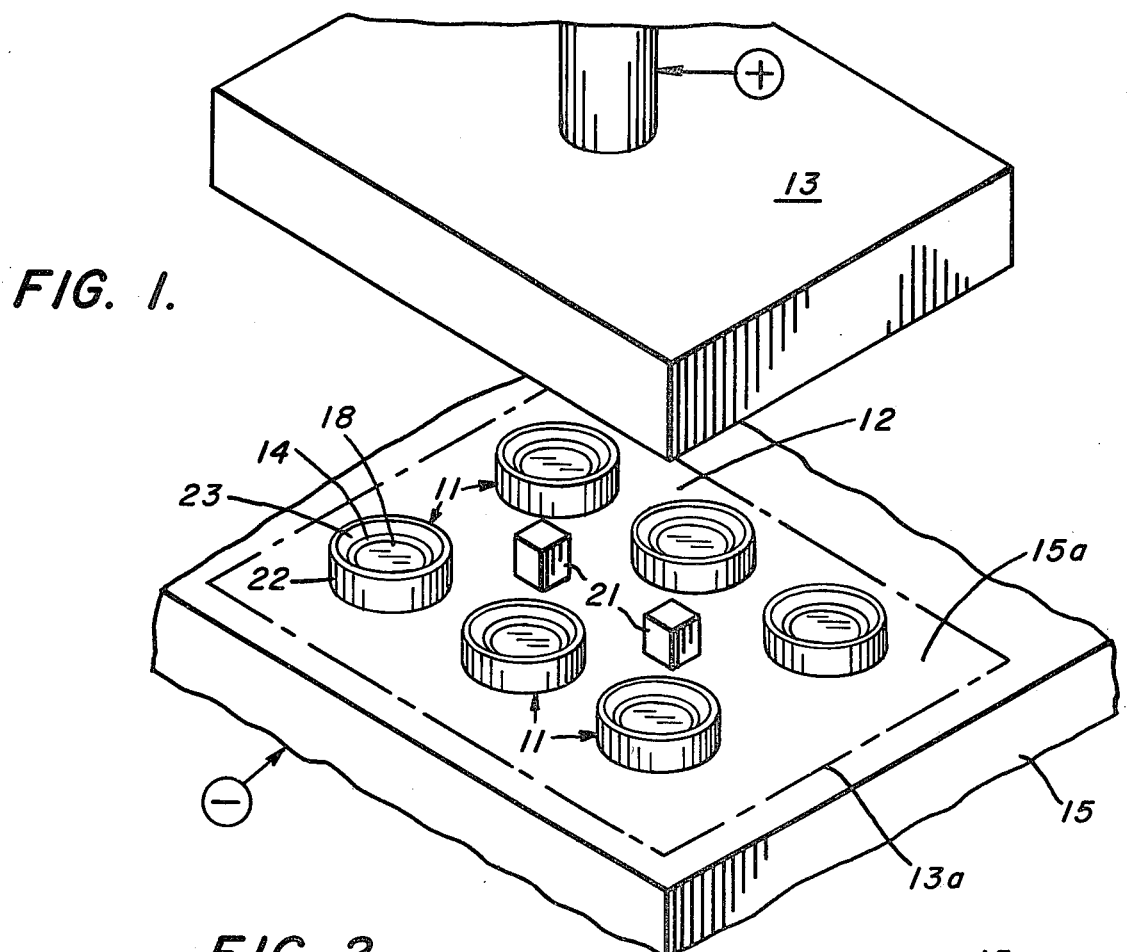
FIG. 1 is a fragmentary perspective view of a portion of an electrolytic cell for the production of aluminum constructed in accordance with the present invention.
Figure 2:
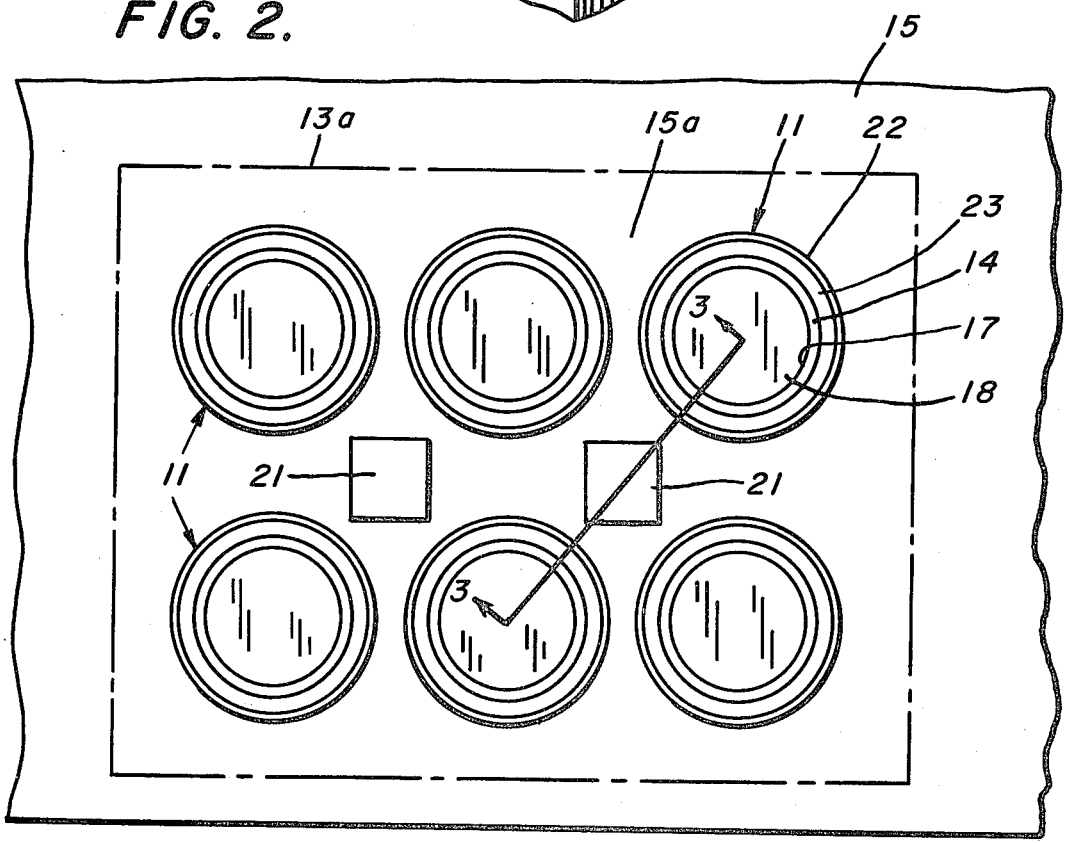
FIG. 2 is a top elevational view of the electrolytic cell of FIG. 1.

A preferred embodiment of an electrolytic cell for production of aluminum having cathodes 11 protected from thermal shock in accordance with the present invention is illustrated in FIG. 1. The portion of the cell shown in FIG. 1 is at room temperature prior to initiating start up and before any molten bath is poured into the cell chamber 12. For clarity of illustration, the carbon anode 13 is shown elevated several inches above the cathodes 11. In FIG. 2, a rectangle 13a represents the shadow of the anode 13. Portions of the electrolytic cell not shown are similar to the cell described and illustrated in U.S. Pat. No. 4,071,420, the disclosure of which is incorporated by reference to the extent not inconsistent with the present invention.

Referring now to FIGS. 1-3, each cathode 11 comprises a hollow body or cylindrical sintered $TiB_2$ tube 14 having a height of four inches, an internal diameter of three inches, and a wall thickness of one-half inch. Six round holes accepting the $TiB_2$ tubes 14 were cut in a carbon cathode block 15 at a depth of 2½ inches using a core drill bit of appropriate size. Proximal portions of the $TiB_2$ tubes 14 were then cemented into each annular depression and leveled at a height of 1½ inches above the upper surface portion 15a of the cathode block 15. Persons skilled in the art will understand that the dimensions stated above may be varied without departing from the present invention. A suitable cement 16 is sold under the trade designation C-34 by Union Carbide Corporation. This cement includes particles of carbon in a resin base and provides an electrically conductive bond between the cathode block 15 and $TiB_2$ tubes 14.

As shown in FIGS. 1 and 3, each cathode 11 includes a proximal portion cemented to the cathode block 15 and a distal or protruding portion extending toward the anode 13. The cathodes 11 are formed from hollow cylindrical bodies extending into the chamber 12 in the direction of the anode 13. When cemented to the cathode block 15, each hollow body defines a cavity 17 open at a distal end closest the anode 13 and closed at a proximal end opposite the distal end.

While the present invention is described with reference to a single preferred embodiment wherein $TiB_2$ tubes 14 are provided with thermal shock protection, the cathodes 11 may be formed from other refractory hard substances. The borides, nitrides and carbides of titanium and zirconium, for example, are suitable. The start up method of the present invention may also be used for protecting from thermal shock anodes made of various other refractory materials including electrically conductive oxides of divalent and trivalent metals inert to the contents of the cell at its operating temperature. Examples of such oxides are $CoCr_2O_4$, $TiFe_2O_4$, $CoY_2O_4$, $NiCr_2O_4$ and $NiCo_2O_4$.

The cavity 17 in each $TiB_2$ tube 14 is filled by a heat conductor means, preferably a solid metal plug 18. The heat conductor means has a thermal conductivity greater than that of the $TiB_2$ tube or hollow body 14, thereby minimizing temperature differences between various locations on each hollow body. In a preferred embodiment the metal plug 18 comprises a cylinder of an alloy of aluminum containing 33.2% copper. This alloy has a melting point of 547° C. Other alloys of aluminum having melting points in the range of about 450° to 550° C. are also suitable. Alloys of zinc, tin and magnesium with aluminum may be used instead of the Cu—Al alloy described above. Alloys that wet $TiB_2$ are preferred. The plug 18 should preferably have a melting point less than the melting temperature of aluminum (660° C.) in order to protect the cathodes 11 from thermal shock during final stages of heating. It is, of course, desirable that the plug 18 have a boiling point greater than the operating temperature of the cell.

The metal plug 18 is inserted as a solid cylinder into the cavity 17 prior to starting up the cell. Each $TiB_2$ tube 14 is shaped to define a cylindrical cavity 17 having an inner diameter slightly greater than the outer diameter of the metal plug 18. The tube 14 therefore does not burst upon heating, even though metal of the plug 18 has a greater coefficient of thermal expansion than $TiB_2$.

In the preferred embodiment of FIGS. 1-3, the cell is provided during start up with several carbon resistor blocks 21 extending between an upper surface portion 15a of the cathode block 15 and the anode 13. Each resistor block 21 has transverse dimensions of two inches by two inches and has a height of 2¾ inches. Each of these blocks 21 acts as an auxiliary radiant heat source to supply radiant heat to the chamber 12 during the final stages of cell heat up. A current of at least five amps per square inch is passed through the blocks 21, thereby heating their outer surfaces to temperatures of about 2000° C. It has been found that when unprotected $TiB_2$ tubes 14 are exposed to radiant heat at temperatures of this magnitude, the tubes 14 may break under the stress of thermal shock.

In accordance with the present invention, the $TiB_2$ tubes 14 are protected from thermal shock by encircling each tube 14 with a heat dispersing means or metal jacket 22. Each jacket 22 is at least about ⅛ inch thick, has a diameter one inch greater than the corresponding tubes 14 and is ½ inch higher than the tubes 14. Mild steel and stainless steel have been tried for the heat dispersing means 22, but stainless steel is superior because of its higher melting point and resistance to high temperature oxidation. The heat dispersing means should have a melting point at least approximating the operating temperature of the cell. When the cell is used for electrolytic production of aluminum, the heat dispersing means preferably has a melting point of greater than about 1400° C. The heat dispersing means should also be resistant to oxidation and structurally rigid at temperatures of about 1400° C.

Additional thermal shock protection is provided by interposing a heat insulating means between the resistor blocks 21 and $TiB_2$ tubes 14. Each heat insulating means preferably comprises a generally cylindrical sleeve 23 of expanded fibrous kaolin insulating material. As shown in FIG. 3, the sleeve 23 has a thickness of about ½ inch, filling the gap between the metal jacket 22 and hollow $TiB_2$ tube 14. One preferred insulating material is sold under the trade designation Kaowool Unifelt 3000 by Babcock & Wilcox. Other insulating materials may be used provided they have melting points of greater than about 1400° to 1500° C., are chemically stable at temperatures of at least 2000° C. and are soluble in the cell contents or media at the operating temperature of the cell. In a preferred electrolytic cell for production of aluminum, the cell chamber contains a molten bath at its operating temperature that is predominantly cryolite, and the kaolin sleeve dissolves in the molten bath. When other insulating materials are substituted for kaolin, the insulating effect should preferably be equivalent to a ½ inch thickness of material having a thermal conductivity less than about 0.7 BTU/(hr) (ft²)(°F./in). This preferred thickness may be reduced if a better insulator is used, but a greater thickness of material is desirable when thermal conductivity of the heat insulating means is increased. When the heat insulating means is expanded kaolin, a lesser thickness of as little as ¼ inch may be quite beneficial.

In a preferred cell start up performed in accordance with the present invention, 240 hollow $TiB_2$ tubes 14 were cemented to a cathode block 15 and protected from thermal shock, as shown in FIGS. 1 and 2. Several hundred pounds of charcoal briquettes (not shown) were distributed around the $TiB_2$ tubes 14 in accordance with the preheating method disclosed in Minick U.S. Pat. No. 4,146,444, issued Mar. 27, 1979. The anodes 13 were then placed in the cell, resting on the resistor blocks 21. The sides, ends and middle of the cell were filled with charcoal adjacent the anodes 13 to a depth of about five to six inches. The briquettes were soaked with kerosene and ignited, with air being pumped into the cell through ducts (not shown) to enhance burning. The ignited charcoal briquettes act as an auxiliary source of radiant heat in the initial stages of cell start up. The cell temperature rose to about 550° to 600° C. at a rate of about 50° C./hr.

After the cell reached a temperature of about 600° C., DC current was passed from the anodes 13 through the resistor blocks 21 and cathode block 15. When the cell temperature reached about 950° C., the spent charcoal was removed, the cell was filled with solid an liquid bath having the following nominal composition in weight percent: 79% cryolite, 11% $AlF_3$, 6% $CaF_2$ and 4% $Al_2O_3$, and electrolysis was started. After all of the bath was melted, the resistor blocks 21 were removed, and the anodes 13 were lowered to within about ⅜ inch of the $TiB_2$ tubes 14.

In the first few days of electrolysis, aluminum tapped from the cell had significant levels of Cu, Fe and Si impurities resulting from dissolution of the thermal shock protection elements of the cell. However, within 18 days the cell was producing 99.9% pure aluminum. Inspection of the cell after five weeks revealed that only one $TiB_2$ tube had been chipped and another $TiB_2$ tube was broken.

While the foregoing description of my invention has been made with reference to a preferred embodiment, numerous changes and modifications can be made therein without departing from the spirit and scope of the invention described in the following claims.

What is claimed is:

1. A method for starting up an electrolytic cell operated at an elevated temperature and comprising an anode and a cathode spaced from the anode, said cathode including at least one hollow body defining a cavity open at a distal end closest the anode and closed at a proximal end opposed to the distal end, said method comprising the steps of
   inserting into the cavity a heat conductor means comprising a metal plug having a melting point less than the melting point of aluminum, and
   heating the cell to its operating temperature.

2. The method of claim 1 wherein the cell constitutes an electrolytic cell for production of a metal, the operating temperature of the cell is greater than the melting point of the metal produced, and the metal plug has a melting point less than the operating temperature of the cell.

3. The method of claim 1 wherein the cell constitutes a cell for electrolytic production of aluminum, and wherein the operating temperature of the cell is greater than the melting point of aluminum.

4. The method of claim 1 wherein the electrolytic cell further comprises a chamber for containing a molten bath providing an electrical connection between the anode and cathode, said hollow body including a portion protruding into the chamber, and wherein the cell is heated by an auxiliary heat source, said method further comprising
   interposing between the hollow body and the auxiliary heat source a heat insulating means, said heat insulating means comprising a sleeve of insulating material.

5. The method of claim 4 wherein said sleeve of insulating material comprises at least a ¼ inch thickness of a material having a thermal conductivity less than about 0.7 BTU/(hr)(ft²)(°F./in).

6. The method of claim 1 wherein the electrolytic cell further comprises a chamber for containing a molten bath providing an electrical connection between the anode and cathode, said hollow body including a portion protruding into the chamber, and wherein the cell is heated by an auxiliary heat source, said method further comprising
   encircling the protruding portion of said hollow body with a heat dispersing means for minimizing temperature differences between various locations on the hollow body as the cell is heated to its operating temperature, said heat dispersing means comprising a metal jacket spaced radially outwardly of the hollow body and proximate thereto, said metal jacket having a melting point at least approximating that of the operating temperature of the cell.

7. The method of claim 6 wherein said metal jacket is soluble in the molten media contained in the chamber, at the operating temperature of the cell.

8. The method of claim 6 wherein said metal jacket has a melting point of greater than about 1400° C.

9. The method of claim 6 further comprising
   interposing between the hollow body and the metal jacket a heat insulating means, said heat insulating means comprising a sleeve of an insulating material.

10. The method of claim 1 wherein said hollow body comprises a refractory hard substance selected from the group consisting of borides, nitrides and carbides of titanium and zirconium.

11. The method of claim 1 wherein said electrolytic cell constitutes a cell for electrolytic production of aluminum.

12. The method of claim 1 wherein said metal plug comprises an alloy of aluminum having a melting point less than the melting point of aluminum.

13. The method of claim 12 wherein said metal plug comprises an aluminum-copper alloy.

14. An electrolytic cell for production of metal at an elevated operating temperature, comprising
   an anode,
   a cathode spaced from the anode and including at least one hollow body, said hollow body defining a cavity open at a distal end closest the anode and closed at a proximal end opposed to the distal end, and
   heat conductor means in said cavity comprising a metal plug having a thermal conductivity greater than that of the hollow body and a melting point less than the melting point of aluminum.

15. The electrolytic cell of claim 13 further comprising
   a chamber for containing a molten bath electrically connecting the anode and cathode, said hollow body including a portion protruding into the chamber.

16. The electrolytic cell of claim 15 further comprising
   an auxiliary heat source for heating the cell, and
   heat dispersing means encircling the protruding portion of the cathode during start up, said heat dispersing means comprising a metal jacket spaced radially outwardly of the cathode and proximate thereto.

17. The electrolytic cell of claim 15 further comprising
a heat insulating means comprising a sleeve of an insulating material encircling the protruding portion adjacent thereto during startup.

18. The electrolytic cell of claim 14 wherein said metal plug comprises an alloy of aluminum.

19. The electrolytic cell of claim 18 wherein said metal plug comprises an aluminum-copper alloy.

20. An electrode suitable for use in an electrolytic cell for production of a metal at an elevated temperature, said electrode comprising
a hollow body comprising a refractory material, said hollow body defining a cavity open at at least one end thereof, and
heat conductor means in said cavity comprising a metal plug having a thermal conductivity greater than that of the refractory material and a melting point less than the melting point of aluminum.

21. The electrode of claim 20 wherein said metal plug comprises an alloy of aluminum.

22. The electrode of claim 21 wherein said metal plug comprises an aluminum-copper alloy.

23. A method for starting up an electrolytic cell operated at an elevated operating temperature and comprising a chamber, an anode, a cathode spaced from the anode and including a portion protruding into the chamber in the direction of the anode, and an auxiliary heat source for heating the cell to its operating temperature, said method comprising the steps of
encircling said protruding portion of the cathode with a heat dispersing means for minimizing temperature differences between various locations on the cathode as the cell is heated to its operating temperature, said heat dispersing means comprising a metal jacket spaced radially outwardly of the cathode and proximate thereto, said metal jacket having a melting point at least approximating the operating temperature of the cell, and
transferring heat from the auxiliary heat source to the cell.

24. The method of claim 23 further comprising interposing between the protruding portion and the metal jacket a heat insulating means comprising a sleeve of insulating material.

25. An electrolytic cell for production of a metal at an elevated operating temperature, comprising a chamber,
an anode,
a cathode spaced from the anode and including a portion protruding into the chamber in the direction of the anode,
an auxiliary heat source for heating the cell, and
heat dispersing means encircling the protruding portion of the cathode during start up, said heat dispersing means comprising a metal jacket spaced radially outwardly of the cathode and proximate thereto, said metal jacket having a melting point at least approximating the operating temperature of the cell.

26. The electrolytic cell of claim 25 further comprising
a heat insulating means between the protruding portion of the cathode and the metal jacket during start up, said heat insulating means comprising a sleeve of insulating material.

27. The electrolytic cell of claim 21 wherein said cathode comprises at least one hollow body defining a cavity open at a distal end closest the anode and closed at a proximal end opposed to the distal end, said cell further comprising
heat conductor means in said cavity during start up of the cell comprising a metal plug having a thermal conductivity greater than that of the hollow body.

28. The electrolytic cell of claim 27 wherein said metal plug has a melting point less than the melting point of aluminum.

29. The electrolytic cell of claim 28 wherein said metal plug comprises an alloy of aluminum.

30. The electrolytic cell of claim 29 wherein said metal plug comprises an aluminum-copper alloy.

31. An electrode suitable for use in an electrolytic cell for production of a metal at an operating temperature greater than the melting point of the metal, said cell including a chamber and an auxiliary heat source in the chamber, said electrode comprising
a portion comprising a refractory material, and
heat dispersing means encircling said portion, said heat dispersing means comprising a metal jacket adjacent the portion, said metal jacket having a melting point at least approximating the operating temperature of the cell.

32. The electrode of claim 31 further comprising
a heat insulating means between the the cathode and the metal jacket, said heat insulating means comprising a sleeve of insulating material.

* * * * *